US008608955B2

(12) United States Patent
Steiner et al.

(10) Patent No.: US 8,608,955 B2
(45) Date of Patent: *Dec. 17, 2013

(54) AUTOMATIC SLURRY STRAINER

(75) Inventors: Carl A. Steiner, Erie, PA (US); Yousif A. Khalid Al-Abdullah, Erie, PA (US); Ricky L. Jackson, Union City, PA (US)

(73) Assignee: TM Industrial Supply, Inc., Erie, PA (US)

( * ) Notice: Subject to any disclaimer, the term of this patent is extended or adjusted under 35 U.S.C. 154(b) by 755 days.

This patent is subject to a terminal disclaimer.

(21) Appl. No.: 12/729,510

(22) Filed: Mar. 23, 2010

(65) Prior Publication Data

US 2010/0243584 A1      Sep. 30, 2010

Related U.S. Application Data

(60) Provisional application No. 61/163,079, filed on Mar. 25, 2009.

(51) Int. Cl.
*B01D 33/00* (2006.01)
(52) U.S. Cl.
USPC ........... 210/157; 210/107; 210/108; 210/158; 210/161; 210/358; 210/408; 210/411; 210/433.1
(58) Field of Classification Search
USPC ......... 210/107, 108, 157, 158, 358, 161, 408, 210/411, 433.1, 780, 784
See application file for complete search history.

(56) References Cited

U.S. PATENT DOCUMENTS

| 842,602 | A | 1/1907 | Wurdack |
| 4,426,289 | A | 1/1984 | Svehaug |
| 5,152,891 | A | 10/1992 | Netkowicz et al. |
| 5,262,069 | A | 11/1993 | Kato |
| 5,332,499 | A | 7/1994 | Spencer |
| 5,622,625 | A | 4/1997 | Nagaoka |
| 5,815,544 | A * | 9/1998 | Lefter ............ 376/313 |
| 7,077,957 | B2 * | 7/2006 | Posselt .......... 210/304 |
| 7,981,282 | B2 | 7/2011 | Steiner et al. |
| 8,303,826 | B2 * | 11/2012 | Steiner et al. ...... 210/784 |
| 2005/0126967 | A1 | 6/2005 | Berry, III et al. |
| 2010/0243584 | A1 * | 9/2010 | Steiner et al. ...... 210/784 |

OTHER PUBLICATIONS

Hellan Fluid Strainers—A product of Cleveland Gear—Feb. 1985, hellansales@hellanstrainer.com (6 pages).
"auto-klean filtration" article, Jan. 2006, http://www.auto-kleanfiltration.co.ukt; 2 pages.
"Sieves, Ultrasonics and Filters Specialists for the Process Industry" Russell Finex article, 2008, http://ww.russellfinex.com/; 2 pages.

* cited by examiner

*Primary Examiner* — Duane Smith
*Assistant Examiner* — Paul J Durand
(74) *Attorney, Agent, or Firm* — The Webb Law Firm

(57) ABSTRACT

An automatic strainer assembly for straining a slurry comprises an inlet for receiving the slurry, a horizontally disposed strainer body in fluid communication with the inlet, and a rotatable strainer member received within the body having an inner surface and an outer surface. One or more scrapers are positioned for removing material from the outer surface of the strainer assembly. A collection vessel is positioned substantially below the body for receiving material scraped from the outer surface of the strainer member. A transport member can be provided for returning the scraped material to the slurry supply for reprocessing thereof. An outlet expels the strained slurry. A manual or automatic washdown system is provided for removing the slurry from the strainer member. A radial bearing assembly and radial seal are associated with the drive shaft of the strainer member to prevent galling. A method for processing a slurry is provided.

16 Claims, 21 Drawing Sheets

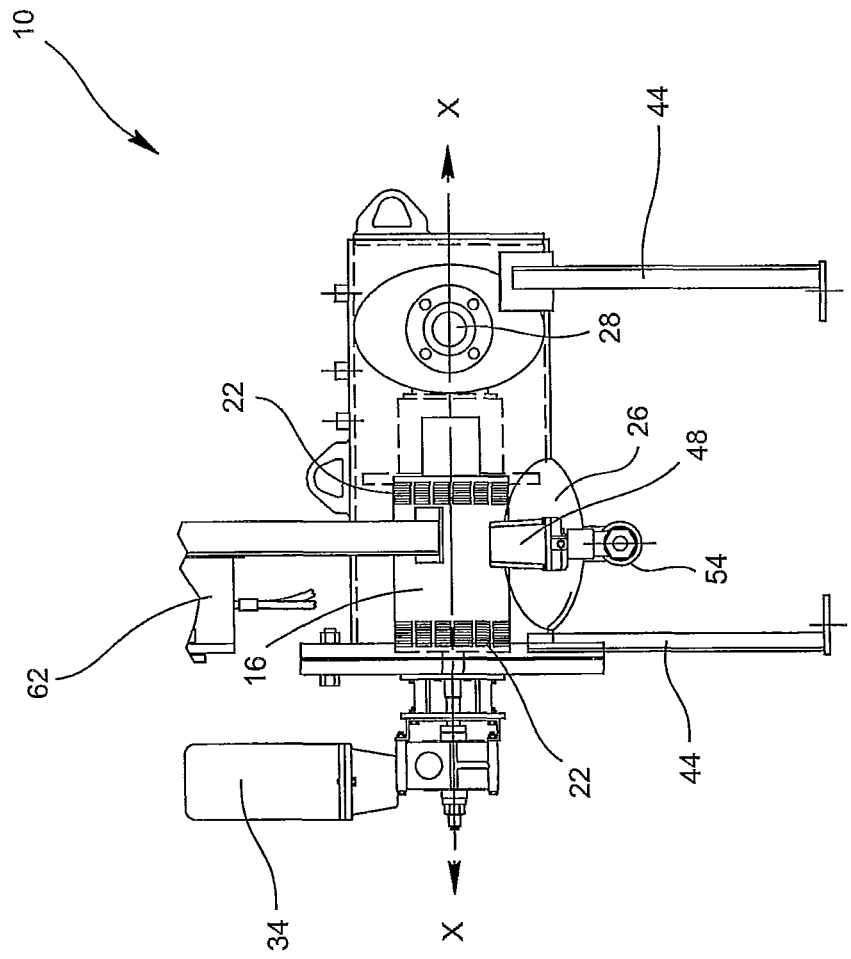

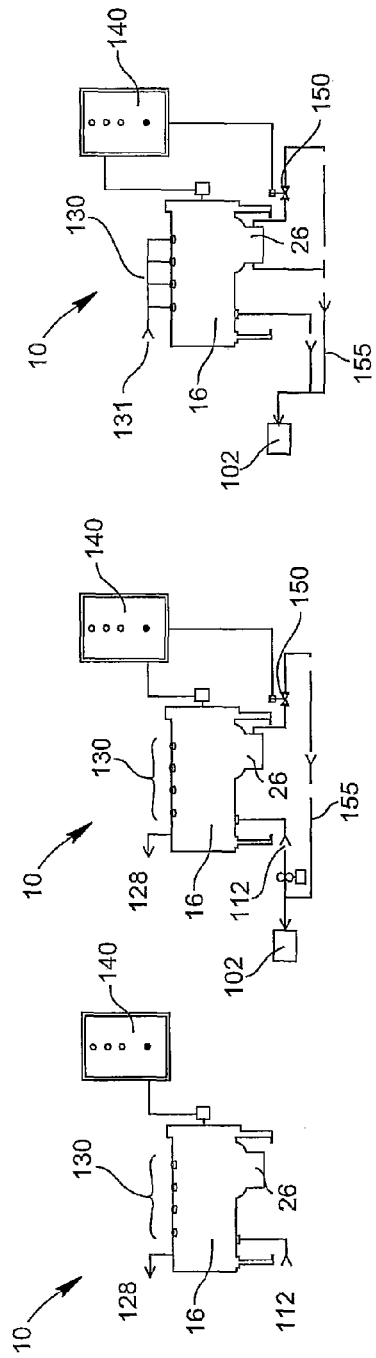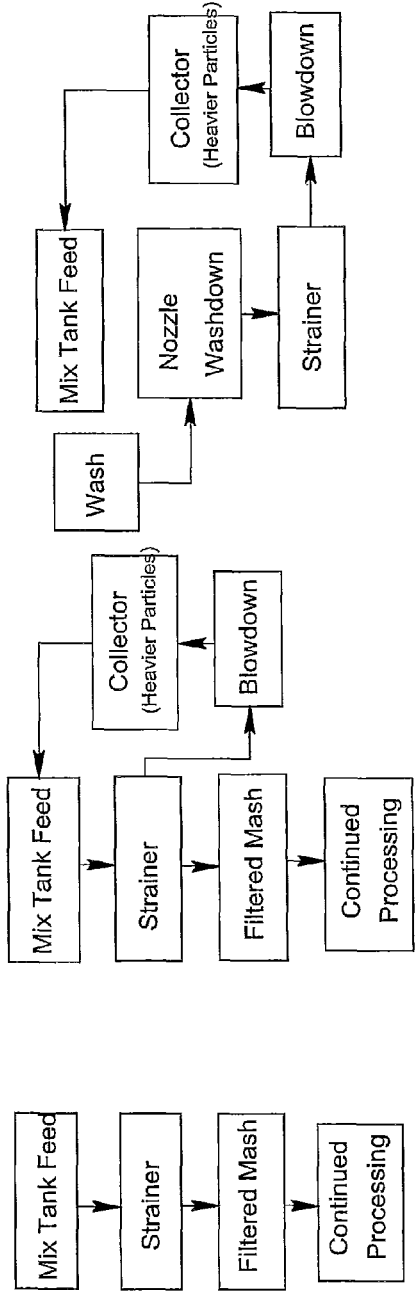

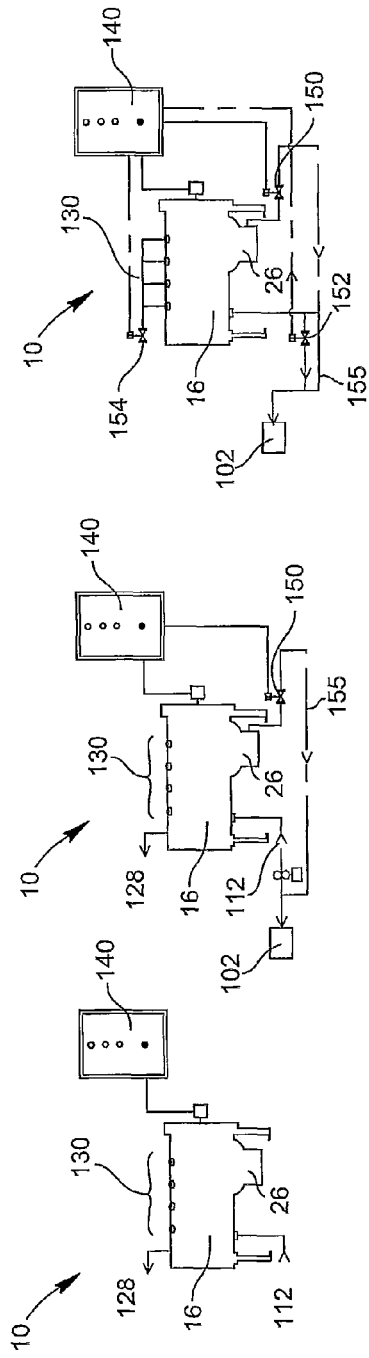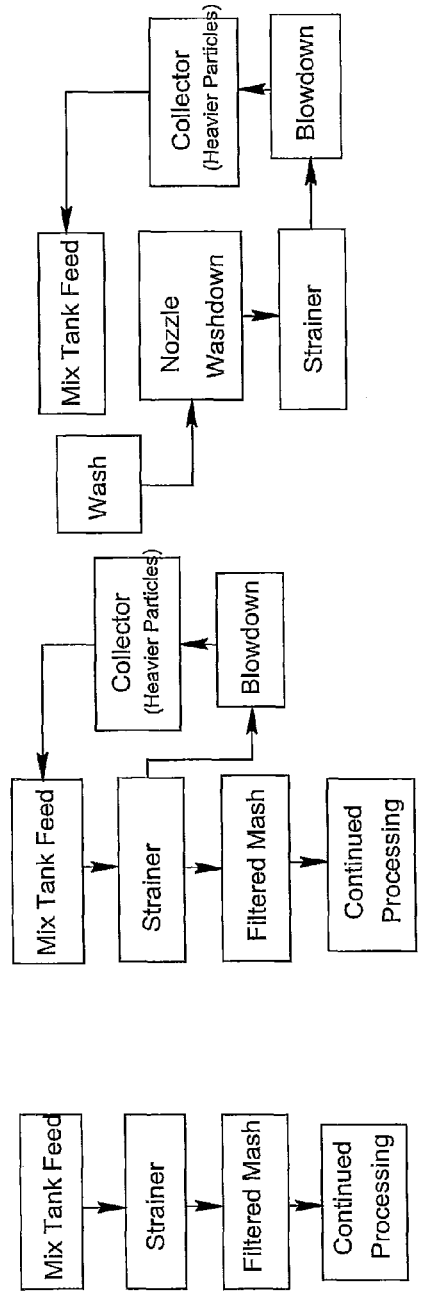

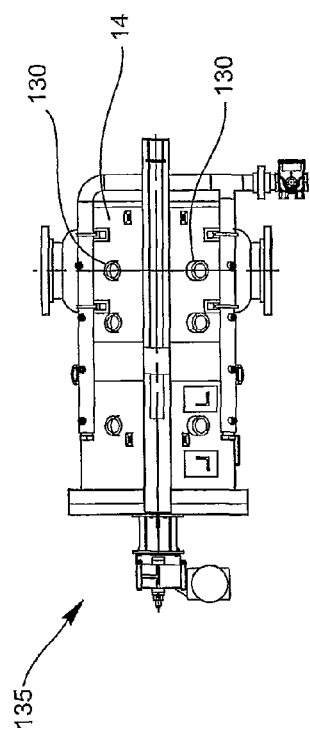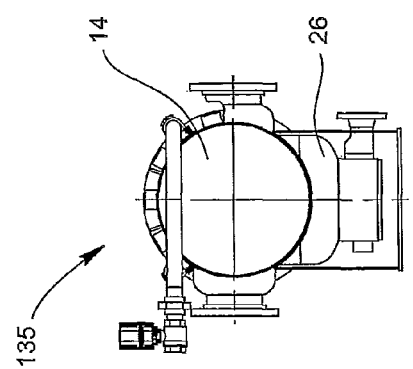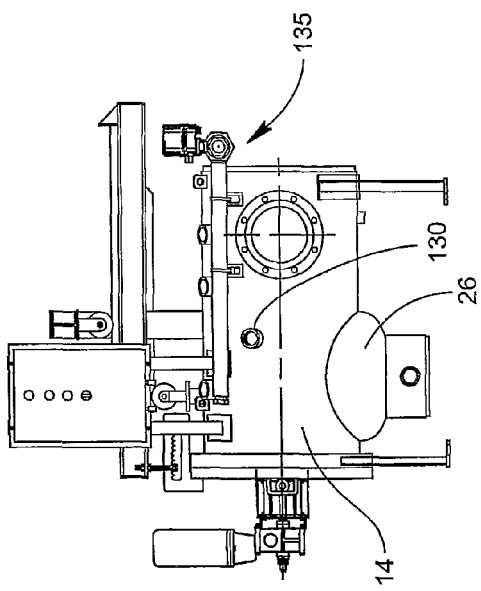

AUTOMATIC SLURRY STRAINER

CROSS REFERENCE TO RELATED APPLICATIONS

This application claims priority from U.S. Provisional Application No. 61/163,079, filed Mar. 25, 2009, which is incorporated herein by reference.

BACKGROUND OF THE INVENTION

1. Field of the Invention

This invention relates to a strainer and, more particularly, to an automatic horizontal strainer for the removal of solids or particles from a slurry, such as in the production of ethanol and other types of fluids.

2. Description of Related Art

In the gasoline industry, ethanol blends are quickly becoming the additive of choice in the production of oxygenated fuels in order to meet the ever-increasing environmental requirements regarding fuel emissions. Examples of ethanol sources include bagasse (forest residue), sawdust, wood waste, yard clippings, rice hulls, corn, soybean, sugar cane, and potatoes, with corn being one of the preferred sources of ethanol. In the manufacture of ethanol, straining of the solids or particles from the mash is a time-consuming effort. Essentially, solids or particles, such as corn solids, are filtered and removed from the fermented liquid by passing a slurry of solids and liquids through a basket-type strainer. Once the basket is filled with solids or particles, the strainer has to be isolated and the basket must be manually removed and cleaned.

SUMMARY OF THE INVENTION

It is therefore an object of the invention to provide an automatic strainer assembly for use with slurries for straining fluid material and removing unwanted solid materials therefrom. It is another object of the invention to provide a strainer assembly for retrieving the solid materials and recycling/reusing these materials. It is yet another object of the invention to provide a strainer assembly having removable components to facilitate cleaning thereof. It is still yet another object of the invention to provide a strainer assembly having a timing mechanism for automatically cleaning out the solid material receptacle. It is another object of the invention to provide an automatic strainer assembly having ergonomically designed components which prevent trapping of solid material pieces in the assembly components and increased overall efficiency of the strainer assembly.

According to one aspect, the present invention is directed to an automatic strainer assembly for straining a slurry, but can be used for straining other fluids. The strainer assembly includes an inlet for receiving the slurry, a horizontally disposed strainer body in fluid communication with the inlet, and a rotatable strainer member received within the body having an inner surface and an outer surface. The strainer member defines a plurality of passageways for strained fluid to pass therethrough. One or more scrapers are positioned in close proximity with the outer surface of the strainer member for removing material from the outer surface of the strainer member. A collection vessel is positioned substantially below the body for receiving material scraped from the outer surface of the strainer member. An outlet is provided in fluid communication with the horizontal strainer body to expel the strained slurry.

According to another aspect, the present invention is directed to an automatic strainer assembly for straining a slurry, wherein the strainer assembly comprises an inlet for receiving the slurry, a horizontally disposed strainer body in fluid communication with the inlet, and a rotatable strainer member received within the body having an inner surface and an outer surface, the strainer defining a passageway for strained fluid to pass therethrough. At least one scraper is positioned in close proximity with the outer surface of the strainer member for removing material from the outer surface of the strainer member and a collection vessel is positioned substantially below the body for receiving material scraped from the outer surface of the strainer member and an outlet is provided for expelling the strained slurry in fluid communication with the horizontal strainer body. A washdown system is provided for intermittent removal of slurry material from the strainer member. This washdown system can comprise a set of internal wash nozzles located within the strainer body and associated with a plurality of wash connection members secured to and extending through the strainer body. The washdown system can be automatically or manually activated. The washdown system can be activated such that the washdown occurs while the strainer member rotates. The strainer assembly can include a transporting member for transporting the material from the collection vessel to a predetermined location for recycling and subsequent straining thereof.

According to another aspect, the invention is directed to an automatic strainer assembly for straining a slurry comprising an inlet for receiving the slurry, a horizontally disposed strainer body in fluid communication with the inlet and a rotatable strainer member received within the body having an inner surface and an outer surface, the strainer defining a passageway for strained fluid to pass therethrough. At least one scraper can be positioned in close proximity with the outer surface of the strainer member for removing material from the outer surface of the strainer member and a collection vessel is positioned substantially below the body for receiving material scraped from the outer surface of the strainer member. An outlet is provided for expelling the strained slurry in fluid communication with the horizontal strainer body. A radial bearing assembly is provided for mounting the rotatable strainer member. The radial bearing assembly can include at least one radial seal for cooperating with the radial bearing assembly. The radial bearing can include packing comprised of a series of O-rings and backing rings.

The present invention is also directed to a method for processing a slurry. The method comprises the steps of providing a processor for producing the slurry, feeding the slurry to an inlet of an automatic strainer assembly to strain the slurry, scraping the strained material from the strainer assembly, collecting the strained slurry from an outlet of the strainer assembly, and retrieving the scraped material from the strained slurry and transporting this material back to a predetermined location. The washdown system can be automatically or manually activated and activation of the washdown can occur while the strainer member rotates. The predetermined location for receiving the scraped material can be the processor and the slurry removed during washdown can also be transported to the processor.

The present invention is also directed to an apparatus for processing a slurry comprising a means for producing the slurry, a means for feeding the slurry to an inlet of an automatic strainer assembly to strain the slurry, a means for scraping the strained material from the strainer assembly, a means for collecting the strained slurry from an outlet of the strainer assembly, a means for retrieving the scraped material from the strained slurry and transporting this material back to a predetermined location and a means for washing down the strainer assembly for intermittent removal of slurry material from the strainer assembly.

These and other features and characteristics of the present invention, as well as the methods of operation and functions of the related elements of structures, and the combination of parts and economies of manufacture, will become more apparent upon consideration of the following description with reference to the accompanying drawings, all of which form a part of this specification, wherein like reference numerals designate corresponding parts in the various figures.

BRIEF DESCRIPTION OF THE DRAWINGS

FIG. 1C shows a side elevational view of the strainer assembly of FIG. 1A;

FIGS. 9A-9C show the sequential operational phases of the manual wash system of the slurry strainer assembly;

FIGS. 9D-9F show flow diagrams of the manual wash system of FIGS. 9A-9C, respectively;

FIGS. 10A-10C show the sequential operational phases and flow diagrams of the automated wash system of the slurry strainer assembly;

FIGS. 10D-10F show flow diagrams of the automated wash system of FIGS. 10A-10C, respectively;

FIG. 11A shows a top view of a strainer assembly, including a washdown manifold layout of the invention;

FIG. 11B shows a side elevational view of the strainer assembly, including the washdown manifold of the invention;

FIG. 11C shows an end view of the strainer assembly, including the washdown manifold of the invention;

BRIEF DESCRIPTION OF THE INVENTION

Figure 1A:
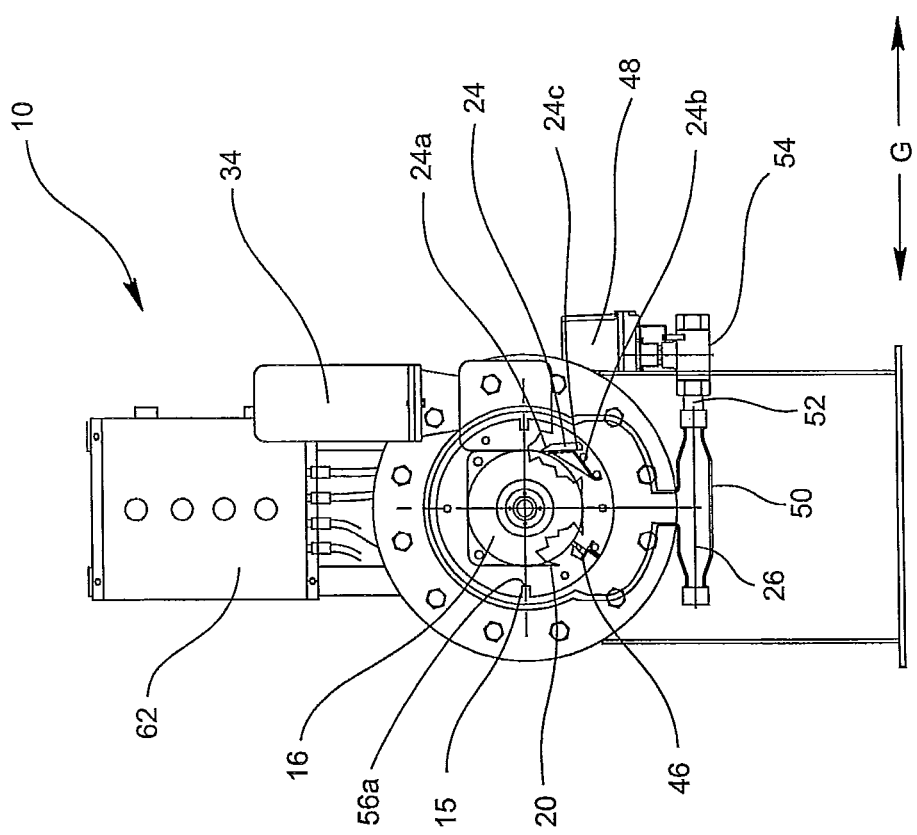
FIG. 1A shows a front elevational view of the strainer assembly according to the invention.
Figure 1B:
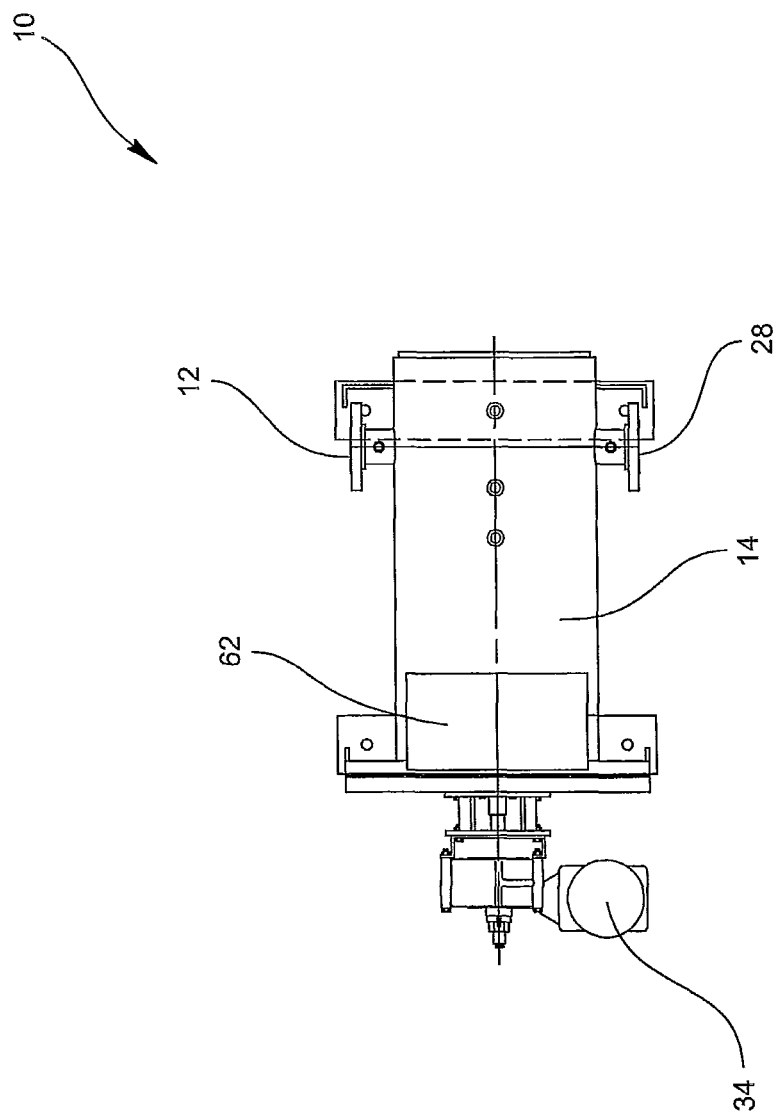
FIG. 1B shows a top plan view of the strainer assembly of FIG. 1A.

For purposes of the description hereinafter, the terms "upper", "lower", "right", "left", "vertical", "horizontal", "top", "bottom", "lateral", "longitudinal", and derivatives thereof, shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

The strainer assembly of the invention is used primarily to remove solids or particles from a slurry. One particular use of the invention is in the production of ethanol utilizing organic material, such as, for example, corn, soybeans and sugar cane. It has been found that certain organic materials or solids, after fermentation, tend to stick together, resulting in difficulty in removing the solids or particles from the strainer screen. The present invention can be used in other industries such as pulp and paper and wastewater, to name a few.

Reference is now made to FIGS. 1A-1C, 2A-2B and 3, which show the strainer assembly, generally indicated as 10, of the invention. The strainer assembly 10 includes an inlet 12 for receiving the slurry, a horizontally disposed strainer body 14 relative to a ground level G in fluid communication with the inlet 12, and a rotatable strainer member 16 received within the body 14. The strainer member 16 has an inner surface 18 and an outer surface 20. The strainer member 16 is preferably a screen-type strainer, such as a perforated or wedge wire screen, which defines a plurality of passageways 22 for strained fluid to pass therethrough. A scraper 24 is positioned substantially adjacent to and in close proximity with the outer surface 20 of the strainer member 16 for removing material from the outer surface of the strainer member 16. A collection vessel 26 is positioned substantially below the body 14 for receiving material scraped from the outer surface 20 of the strainer member 16. An outlet 28 is provided in fluid communication with the horizontal strainer body 14 to expel the strained slurry.

Figure 2A:
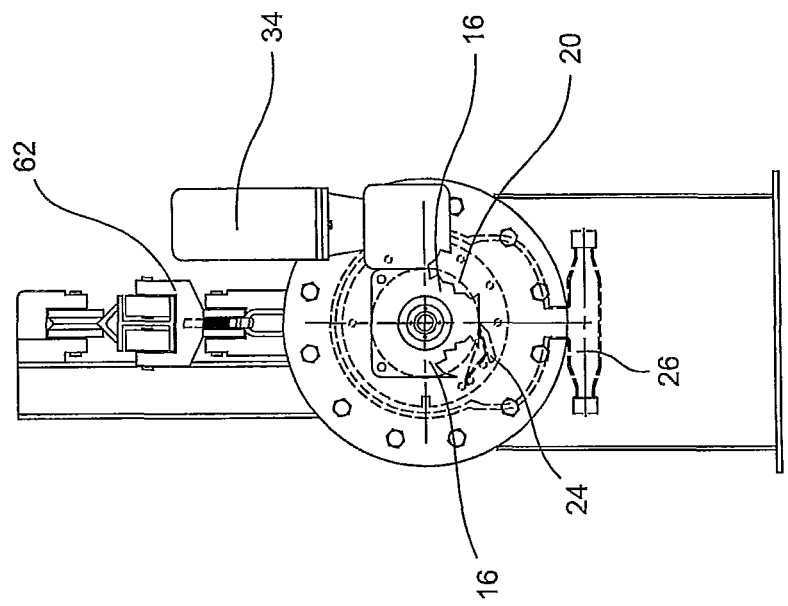
FIG. 2A shows a front elevational view of the strainer assembly of the invention wherein the scraper is positioned at an alternative location.
Figure 2B:
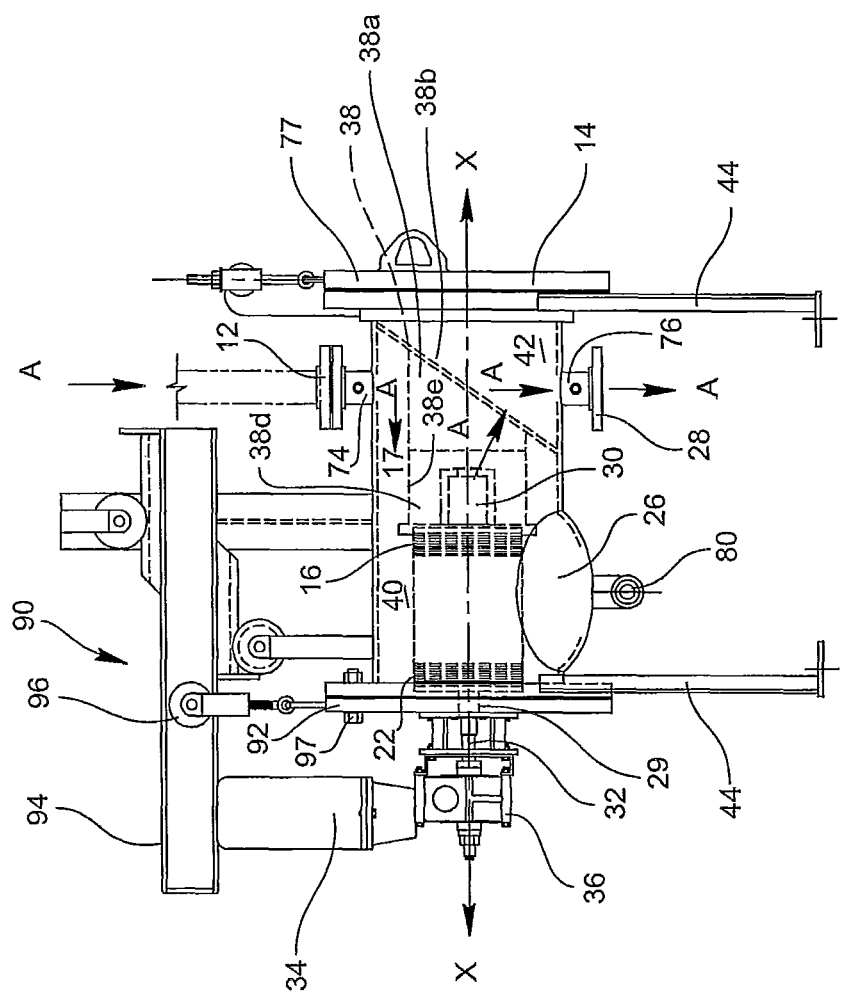
FIG. 2B shows a side elevational view of the strainer assembly of FIG. 2A.

As illustrated in FIGS. 1C and 2B, the strainer assembly 10 and strainer body 14 are horizontally supported by legs 44. The strainer member 16 is rotatably attached to an interior 17 of the strainer body 14. The strainer member 16 is adapted to rotate about a longitudinal axis X and is rotatably secured with bearings 29, 30, and a drive shaft 32 is drivingly coupled to a motor 34 and a drive 36 to rotate the strainer member 16. A divider plate, generally indicated as 38, is provided within the strainer body 14 for separating an inlet portion 40 and an outlet portion 42 of the strainer interior 17. The divider plate 38 includes a center passageway 38b wherein the plate 38 forms an inlet annulus 38a. The annulus 38a also is defined by an inner surface of the strainer body 14 and a divider tube 38d.

An inner surface 38e of the divider tube 38d is in fluid communication with the interior of the strainer member 16 and the outlet 28.

In operation, the strainer member 16 is rotated by motor 34 about the X axis. A slurry, such as corn mash, flows from the inlet 12 through the inlet annulus 38a to the strainer member 16, is strained through passageways 22 of the strainer member 16, and then the strained fluid exits through the divider tube 38d, the divider plate center passageway 38b and, through outlet 28, as shown by arrows A in FIG. 2B. As can be appreciated, the divider plate 38 separates the inlet 12 from the outlet 28, thereby causing the slurry to pass through the strainer member 16. A scraper 24, as shown in FIGS. 1A and 2A, is provided adjacent to and in close proximity with the outer surface 20 of the strainer member 16 for removing any solid material remaining or sticking to this outer surface 20. The collection vessel 26 collects this solid material as it is scraped from the strainer member 16.

The scraper 24 may be located at multiple locations with respect to the strainer member 16. As shown in FIG. 1A, scraper 24 is located to one side of the strainer member 16 prior to the collection vessel 26 with respect to a clockwise rotation of the strainer member 16. As shown in FIG. 1A, preferably, the scraper 24, which includes a scraper blade 24a and scraper holder 24b, is positioned to a side of the strainer member 16 between a 30° and 270° angle with respect to a center point of the horizontally disposed strainer member 16 as the strainer member 16 rotates about the horizontal axis X as shown in FIG. 1C. This particular design allows the scraped material to fall into the collection vessel 26 via gravity as the strainer member 16 rotates. Also, the scraper blade 24a is in close proximity with the outer surface 20 and a downwardly sloping surface passageway 24c is defined between outer surface 20, blade 24a and scraper holder 24b to direct any accumulated material located in the passageway 24c into the collection vessel 26.

According to the design illustrated in FIG. 2A, the scraper 24 can be alternatively positioned at a lowermost portion of the strainer member 16 between the strainer member 16 and the collection vessel 26 so that the scraped material falls by gravity into the collection vessel 26 as the strainer member 16 rotates.

The orientation of the scraper 24 can be manually adjustable with respect to the outer surface 20 of the strainer member 16 to vary the scraping force applied to the material being removed therefrom. The distance between the scraper 24 and this outer surface 20 can also be varied. Additionally, the scraper 24 preferably includes a sharp edge placed in close proximity with the outer surface 20 of the strainer member 16 for cutting any solid particles caught within the passageways 22 of the strainer member. The scraper 24 extends along a major portion of the length of the outer surface 20. Cutting of the solid particles will allow these particles to fall into the collection vessel 26 and allow for automatic cleaning of the screen. A brush 46, as shown in FIG. 1A, may be provided adjacent to the outer surface 20 of the strainer member 16. This brush 46 is preferably located after the strainer member 16 has rotated past the collection vessel 26 in order to loosen any material remaining on the strainer member 16.

The size of the strainer member 16 determines the number of scrapers 24 provided about the periphery thereof. For smaller strainer members 16, such as 2", 4" and 6" diameter strainers, a single scraper 24 is sufficient. With larger strainer members 16, such as 8", 10" and 12" diameter strainers, a load applied to the drive shaft 32 extending through and supporting the strainer member 16 by the force of cutting a large piece of corn on one side of the barrel can become too unbalanced.

Figure 7A:
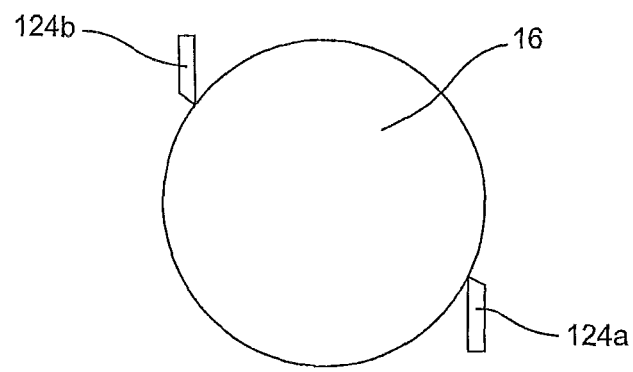
FIG. 7A shows a front elevational view of the strainer member of the invention, wherein a pair of scrapers is positioned about the periphery of the strainer.
Figure 7B:
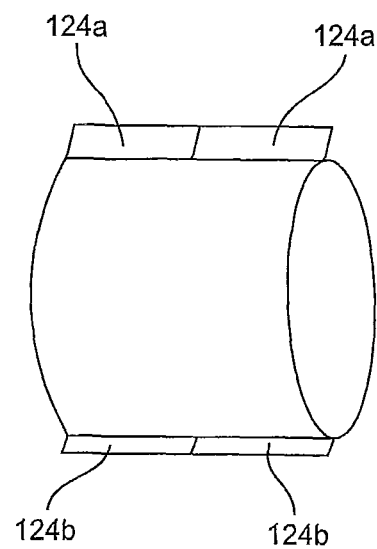
FIG. 7B shows a schematic side view of the strainer member of FIG. 7A, including two sets of a pair of scrapers positioned along the length of the strainer.
Figure 7C:
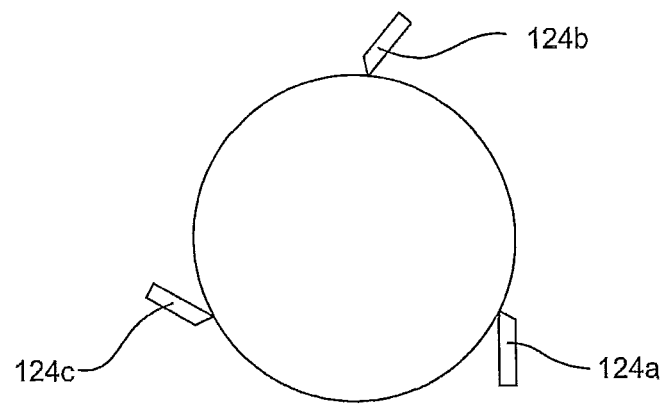
FIG. 7C shows a front elevational view of the strainer member of the invention, wherein a group of three scrapers is positioned about the periphery of the strainer.
Figure 7D:
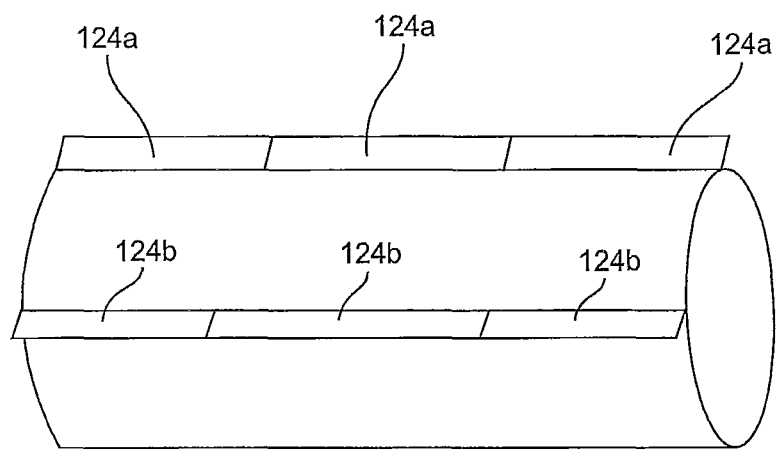
FIG. 7D shows a schematic side view of the strainer member of FIG. 7C, including three sets of the group of scrapers positioned along the length of the strainer.

In order to balance the shaft 32, a pair of scrapers 124a, 124b, as shown in FIG. 7A, can be positioned adjacent to outer surface 20 of the strainer member 16, at substantially equidistant locations with respect to each other, preferably approximately 180° apart from one another, to equally balance the force applied to the drive shaft 32. Additionally, as the diameter of the strainer member 16 increases, so does the length. As illustrated in FIG. 7B, two sets of scraper pairs 124a, 124b are located along the length of the strainer member 16 at approximately twelve inch intervals along the length of the strainer member 16. With even larger strainer members 16, such as ones having 14", 16", 18" and 20" diameters, a group of three cutting blades 124a, 124b, 124c, as shown in FIG. 7C, can be positioned adjacent the outer surface 20 of the strainer member 16, at substantially equidistant locations, preferably approximately 120° apart from one another. As shown in FIG. 7D, three sets of the three cutting blade groups 124a, 124b, 124c are positioned along the length of the strainer member 16 in close proximity with the outer surface 20 thereof at approximately twelve inch intervals. The phrase "in close proximity with" is defined as substantially adjacent to the strainer member, but with a small clearance therebetween, which is sufficient to allow a thin layer of mash to pass therethrough.

In order to further avoid trapping of particles within the passageways 22 of the strainer member 16, it has been found that passageways 22 having a diameter of approximately $15/64$ of an inch works particularly well for corn mash slurries, however the passageway diameter may be optimized for a particular strainer assembly according to the characteristics/particle size of the slurry being processed.

Figure 3:
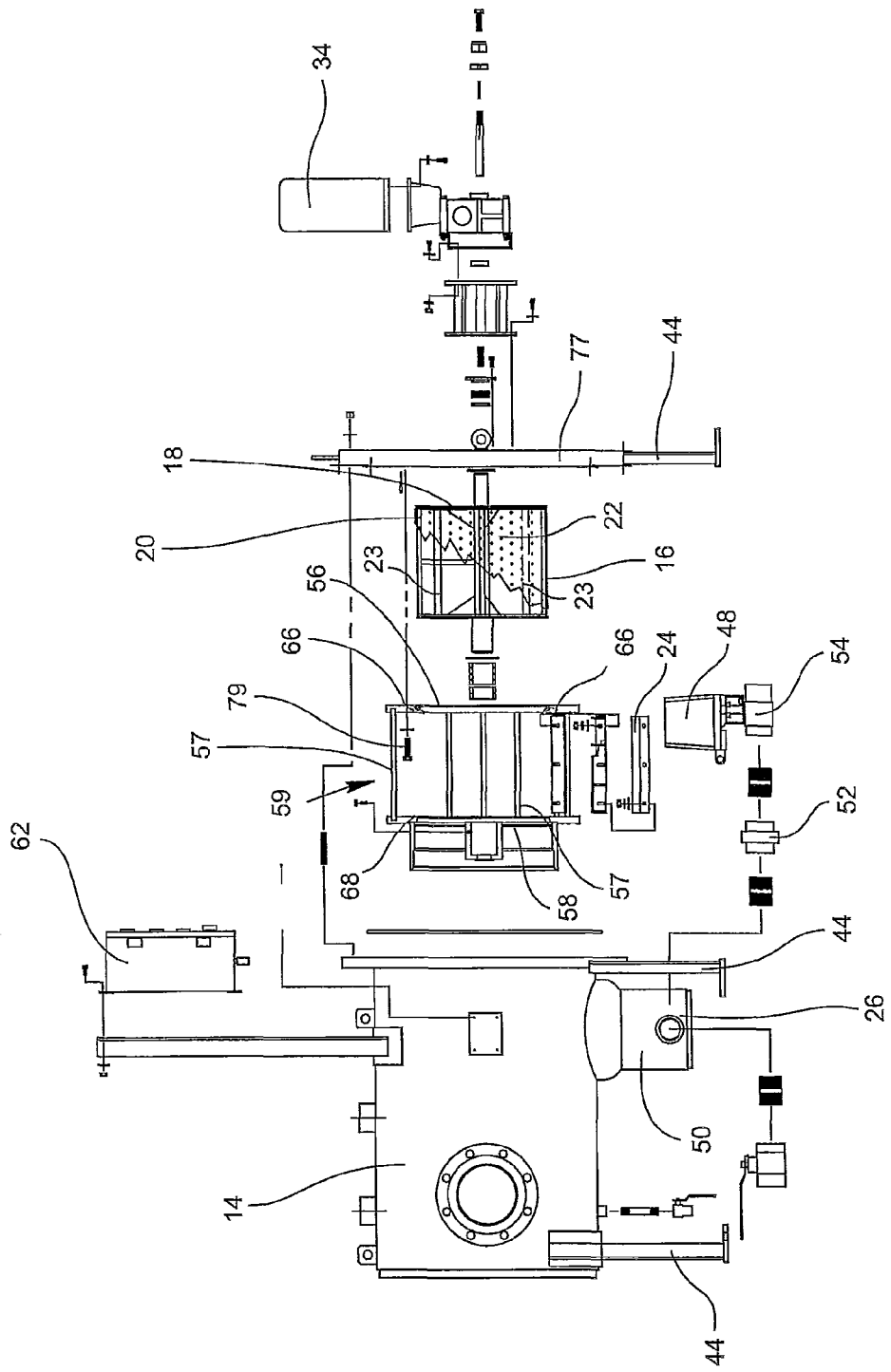
FIG. 3 shows an exploded side elevational view of the strainer assembly of the invention.

As illustrated in FIGS. 1A and 3, the collection vessel 26 tapers down into a collector 50 that is fluidly coupled to piping components 52 and to valve 54 so that the lowest portions of the collector 50, piping components and valve 54 are aligned with each other to prevent collection of debris. At least one blow-off valve 48, including an actuator, is in fluid communication with the valve 54 for flushing out the material from the collection vessel 26. A timing arrangement may also be provided for automatically actuating this blow-off valve 48.

Controls 62 are provided that can cause the activation of motor 34. Also, the controls 62 include the timing arrangement for periodically opening and closing the blow-off valve 48.

Figure 4:
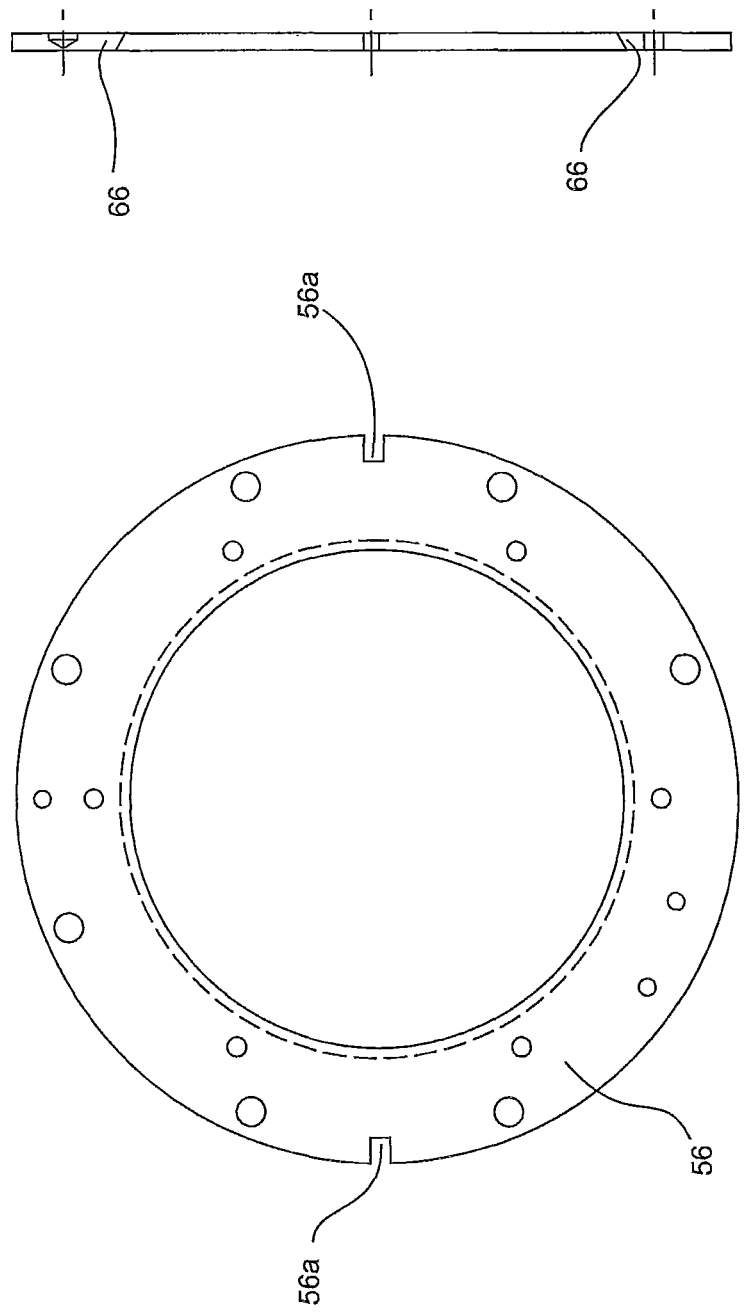
FIGS. 4A and 4B show a front and side view, respectively, of a front plate for supporting the strainer member.
Figure 5:
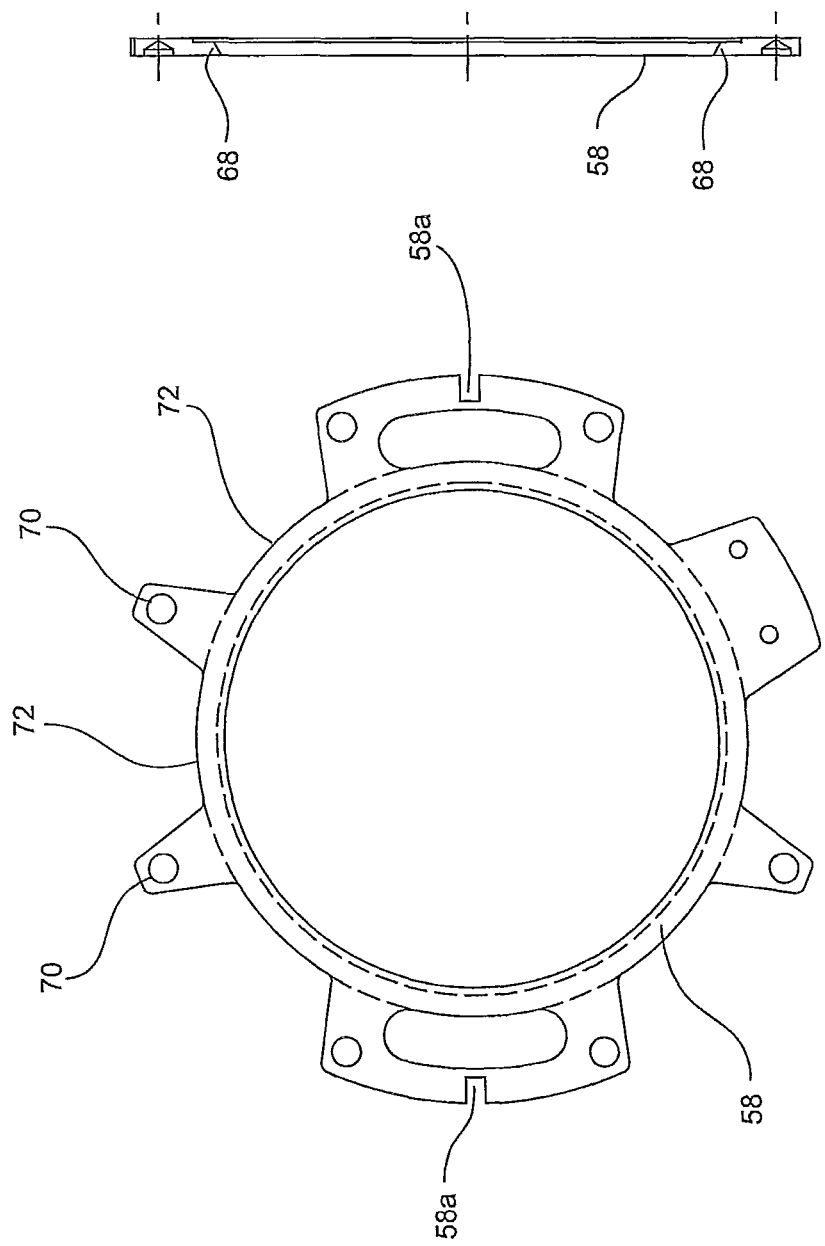
FIGS. 5A and 5B show a front and side view, respectively, of the back plate for supporting the strainer member.

The strainer assembly also includes several efficiency improving components which improve the efficiency of the strainer assembly. The strainer member 16 is enclosed by a cage including a front plate or ring 56, as illustrated in FIGS. 4A and 4B, and a back plate or ring 58, as illustrated in FIGS. 5A and 5B. A slight space is present between the strainer member 16 and the front and back plates 56 and 58. It has been found that during the straining process, particles can become trapped or lodged in this space. These trapped particles can cause excessive torque and premature wear of the strainer member 16 due to additional drag. In order to eliminate this problem, the invention utilizes front and back plates 56, 58 having beveled edge portions 66 and 68 for expelling the particles outwardly with respect to the strainer member 16. Additionally, the back plate 58 can comprise a scalloped surface having protrusions 70 and indentations 72 for facilitating flow of the slurry from the inlet 12 toward the strainer member 16.

As shown in FIG. 2B, another ergonomic design of the invention is the provision of graduated flange portions 74, 76 for the inlet 12 and outlet 28. This design allows for progressive funneling of the slurry through the strainer member 16 and reduces head-loss across the strainer assembly 10. In other words, the inlet 12 converges in diameter into the strainer body 14 and the outlet 28 diverges in diameter from the strainer body 14. Also, provided is a davit assembly 90 coupled to the cover 92. The bearing 29 and strainer member 16 are coupled to the cover 92. The davit assembly includes a davit arm 94 and a wheel 96 co-acting with the davit arm 94 and cover 92. In operation, when the strainer member 16 is to be inspected, the respective fasteners 97 holding cover 92 in place are moved in the X direction. This, in turn, permits the strainer member to be removed from the interior of the strainer body 14 so that the strainer member 16 and other strainer components may be inspected. The process is reversed to assemble the strainer.

As shown in FIG. 3, front plate 56 and back plate 58 are welded to rails 57 to form a cage member, generally illustrated as 59. The rotatable strainer member 16 is slid into cage member 59, then cage member 59, containing strainer member 16, is slid into strainer body 14. Guide rails 15, as shown in FIG. 1A, are provided in the interior of the strainer body 14. Front plate 56 and back plate 58 are provided with notches 56a and 58a, as shown in FIGS. 4A and 5A, which slide along these guide rails 15 during assembly. Cover 77, as shown in FIG. 3, is then attached to the strainer body 14 by a well-known member such as a bolt. This design allows the cover to be removed and the strainer member 16 to be easily pulled out of the strainer body 14 for cleaning by an external water source.

Figure 6:
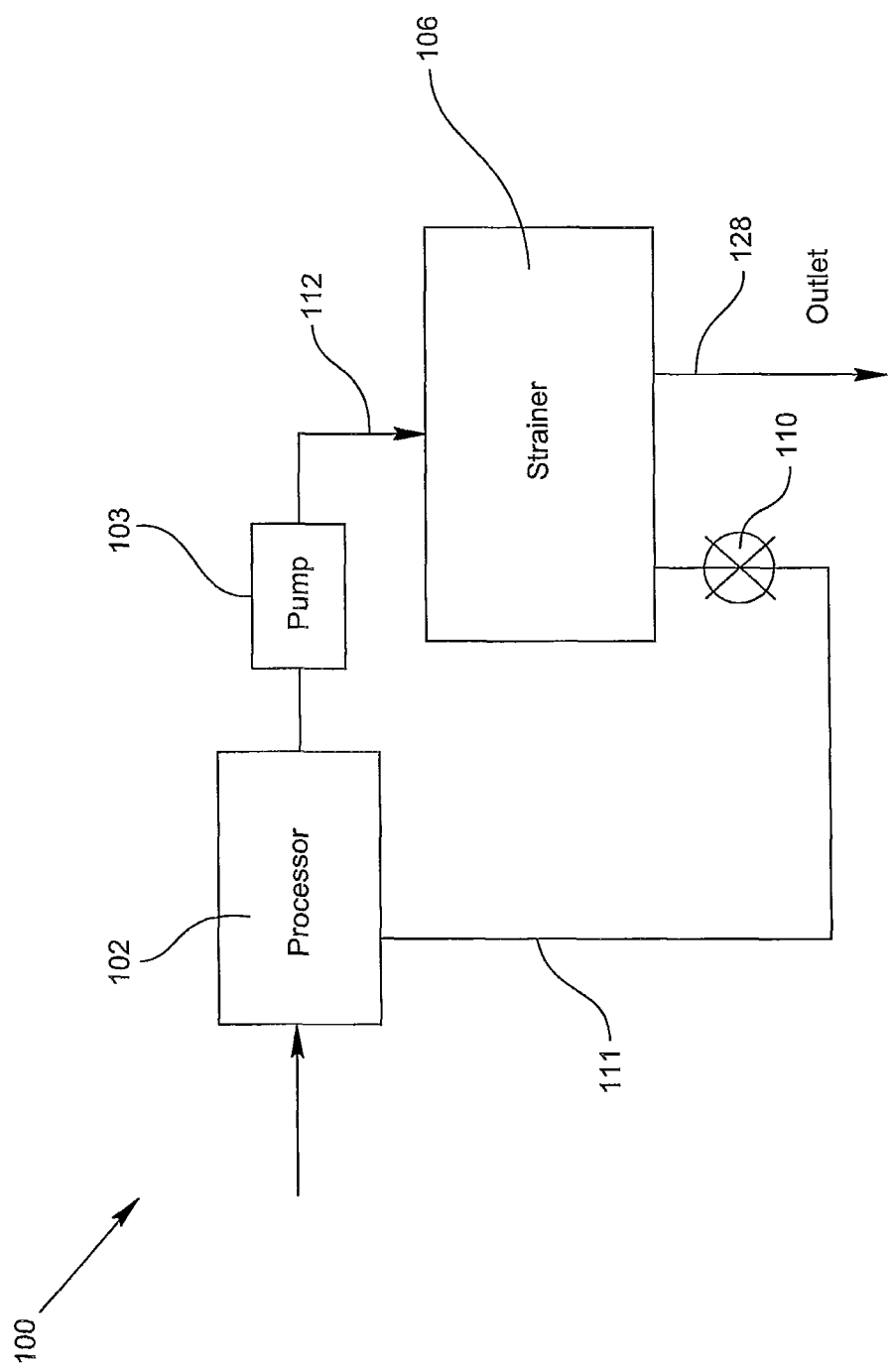
FIG. 6 shows a block diagram showing the recycling method of the invention.

As illustrated in FIG. 6, the present invention provides for a method of processing a slurry, generally indicated as 100. The method includes the steps of providing a processor 102, also known as a mix tank or cooker, for producing the slurry and feeding the slurry via a pump 103 to an inlet 112 of an automatic strainer assembly 106. The strainer assembly 106 can be the strainer assembly 10, as discussed in detail above, or any other type of strainer assembly. This strainer assembly 106 then strains the unwanted sized particles from the slurry and sends the strained slurry to an outlet 128. The method further includes the steps of scraping the strained material from the strainer assembly 106, retrieving the scraped material from the strained slurry via a blowdown pipe 110 and transporting this material 111 back to a predetermined location, such as the slurry processor 102, for recycling thereof or a disposal location. Although the blowdown pipe 110 is shown located between the strainer 106 and the processor 102, this blowdown pipe 110 can alternatively be positioned inline between the processor 102 and the pump 103.

During and after shutdown of the strainer assembly 10, the mash forms a paste or cooks onto the outside of the screen or strainer member 16, as well as the inner surfaces of the strainer member 16 and any other internal surface in contact with the mash. The present invention includes a washdown system, as shown in FIGS. 8A-8B, 9A-9C, 10A-10C, and 11A-11C, for removing this paste. The washdown is provided by a set of internal wash nozzles (not shown) which are associated with wash nozzle connections 130 that are connected to a wash source of liquid wash feed 131. These wash nozzle connections 130 are secured to and extend through the strainer body 14 to remove the corn mash from the strainer member 16 and the other surfaces having corn mash thereon. The cleaning process can be manually actuated or can be a semi-automatic or a fully-automated process. The cleaning process preferably occurs while the motor is running and the strainer member 16 is rotating.

A control panel 140 is provided to initiate a blowdown and/or initiate a washing/cleaning cycle. As shown in FIG. 8B, the slurry strainer assembly 10 can include an automated cleaning process. In the automated process, the control panel 140 includes a wash cycle selector switch 142 which can be activated by the operator after manually closing the inlet valve 143 downstream from inlet 112 and the outlet valve 144 upstream from the outlet 128. The inlet 112 receives feed from the mix tank 102 which receives new feed from a feed source 105. Other switches on the control panel 140 can include a power switch 147, blowdown switch 148 and a valve open switch 149. Activation of the wash cycle selector switch 142 causes valves 150, 152 and 154 to open. The motor will continue to run so the strainer member 16 rotates while washing liquid flows from the liquid feed through valve 154 to the connection 130 of internal wash nozzles (not shown). These nozzles are specially designed to remove mash from the strainer member 16. The washdown manifold layout, generally indicated as 135, is shown in detail in FIGS. 11A-11C. The nozzles 130 are preferably located above the strainer body 14 and extend through the wall of the strainer body 14 so that the washing material contacts the strainer member 16 and flows down through and/or over the strainer member 16 to remove the mash and to subsequently flow out of the strainer body 14 via valves 150, 152 and to flow via line 155 into the mix tank/processor 102 for recycling/mixing thereof with the new slurry feed from feed source 105. One or more auxiliary drains 156 may be provided for removing the wash by-product from the strainer body 14. Any of these drains may, alternately, be connected to a floor drain. A bypass or basket strainer 157 and a series of bypass valves 158 can be provided on a bypass line 159 directly connecting the inlet line 112a with outline 128a and by-passing the strainer body 14.

Figure 8A:
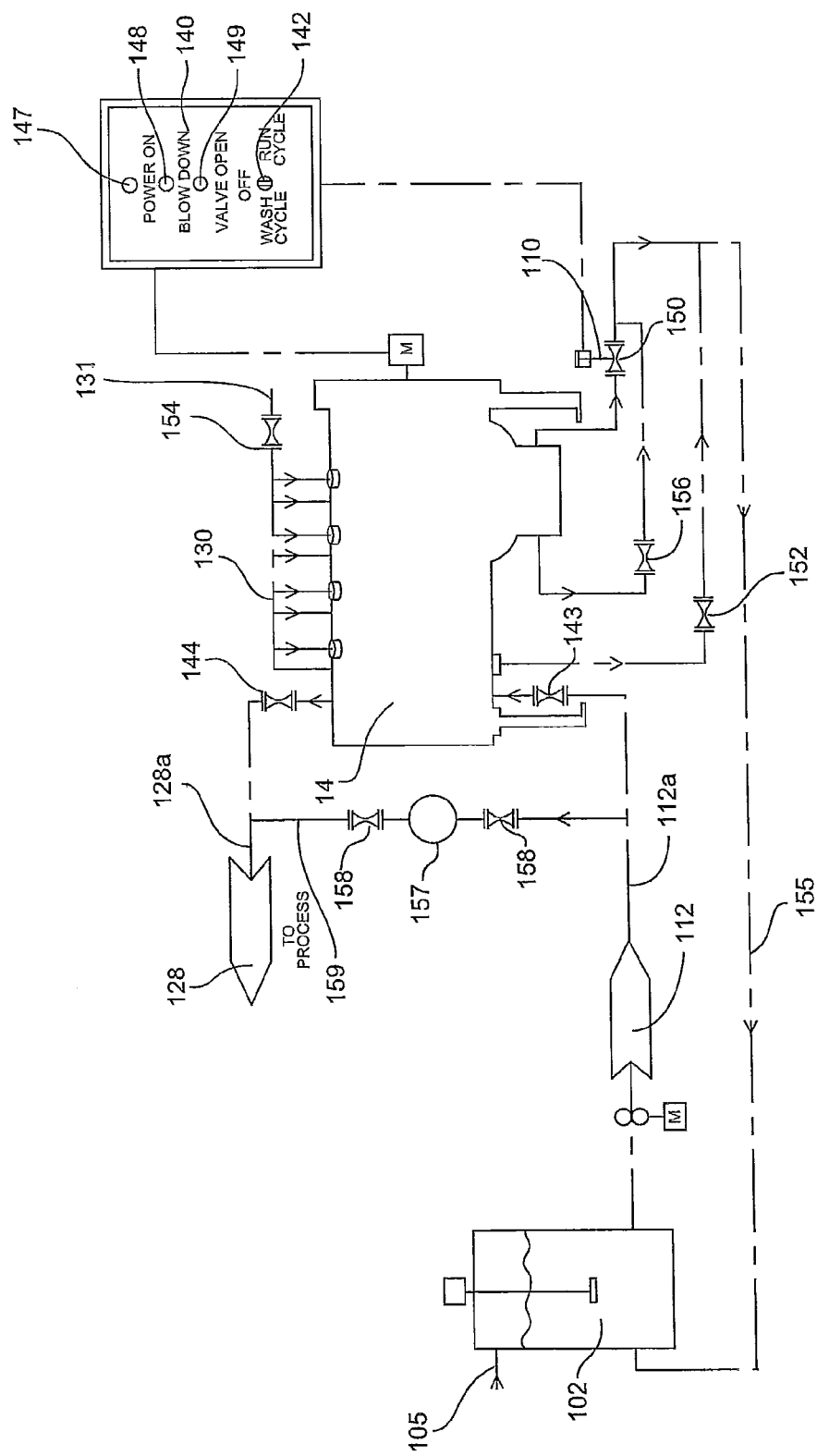
FIG. 8A shows a schematic side view of a manual wash system of the slurry strainer assembly of the invention.
Figure 8B:
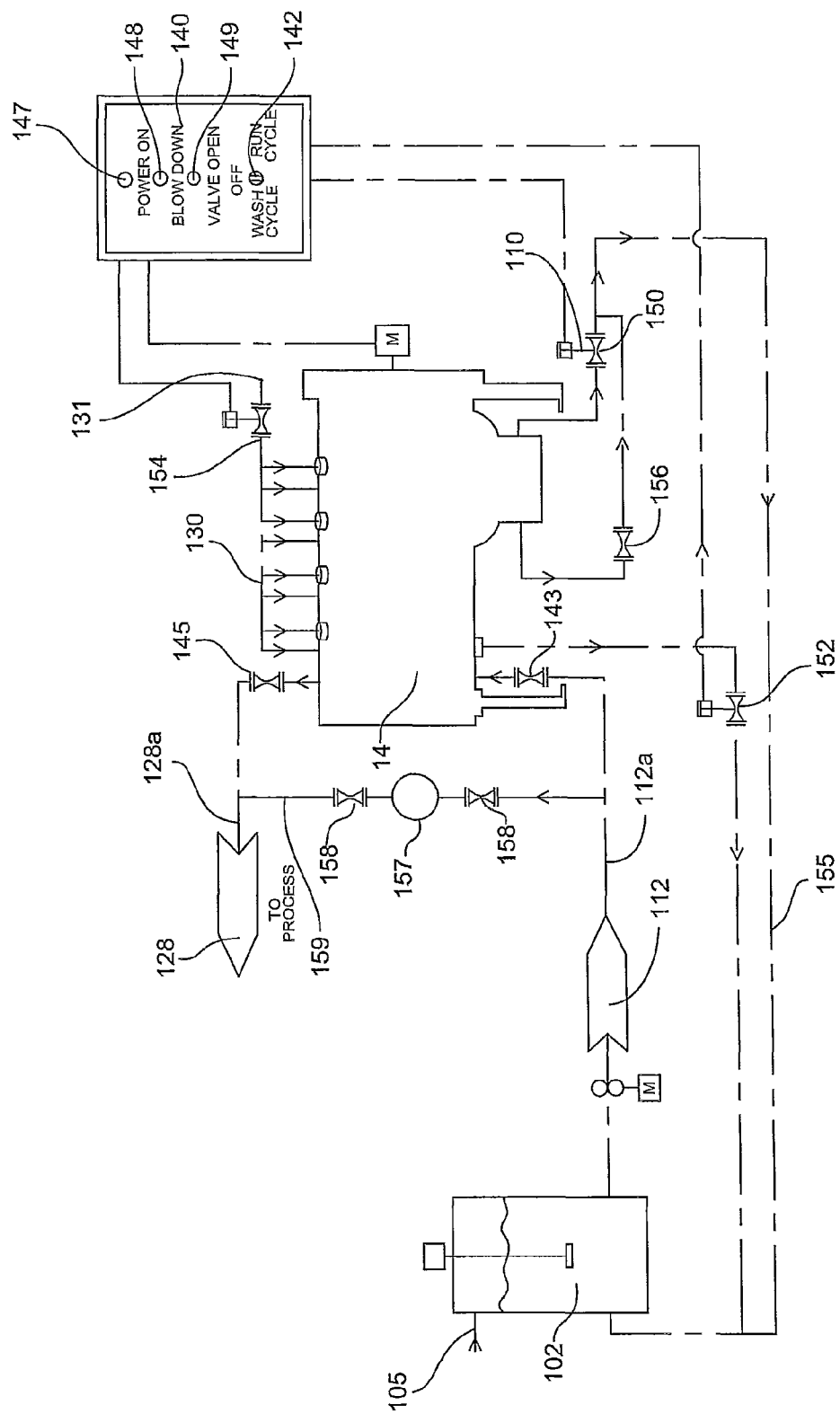
FIG. 8B shows a schematic side view of an automated wash system of the slurry strainer assembly of the invention.

FIG. 8A shows a manual wash system. This system is similar to the automatic wash system of FIG. 8B, except valves 152 and 154 are manual valves which must be opened by the operator. Activation of wash cycle selection switch 142 causes wash valve 150, connected to the blowdown pipe 110, to open and the motor 34 for rotating the strainer member 16, to turn on, if not already running. Washdown of the system is then achieved as in the automatic system, as discussed above. The liquid wash 131 can be any known type of material which is compatible with the system and is typically dependent upon the type of feedstock/slurry being processed.

The operational sequence of a manual wash of the slurry strainer assembly 10 is shown in FIGS. 9A-9F. FIGS. 9A and 9D depict phase I, or the normal operating procedure, showing the flow of slurry in 112 and out 128 of the assembly 10. As illustrated in FIG. 9D, the slurry is fed from the mix tank feed through the inlet into the strainer member. The filtered mash exits the strainer through the outlet for continued processing. FIGS. 9B and 9E depict phase II, or the blowdown procedure, for flushing material from the collection vessel 26. During the blowdown procedure, wash valve 150 is opened and blowdown switch 148 on control panel 140 is activated, causing the heavier particles 118 to fall into collector/collection vessel 26. These heavier particles can be recycled back into mix feed tank 102 via line 155. FIGS. 9C and 9F depict phase III, or the shutdown procedure, wherein the connection 130 of internal wash nozzles are manually activated to receive wash from wash source 131 and remove the corn mash that accumulates on strainer member 16 and in the strainer body 14. FIGS. 10A-10F show the operational sequence of the automated wash of the slurry strainer assembly 10, wherein FIGS. 10A and 10D depict phase I or the normal operating procedure. FIGS. 10B and 10E depict phase II or the blowdown procedure, and FIGS. 10C and 10F depict the phase III or shutdown wash procedure. FIG. 10C also shows the various valves 150, 152, 154 that open to allow for the automated washing.

Figure 12:
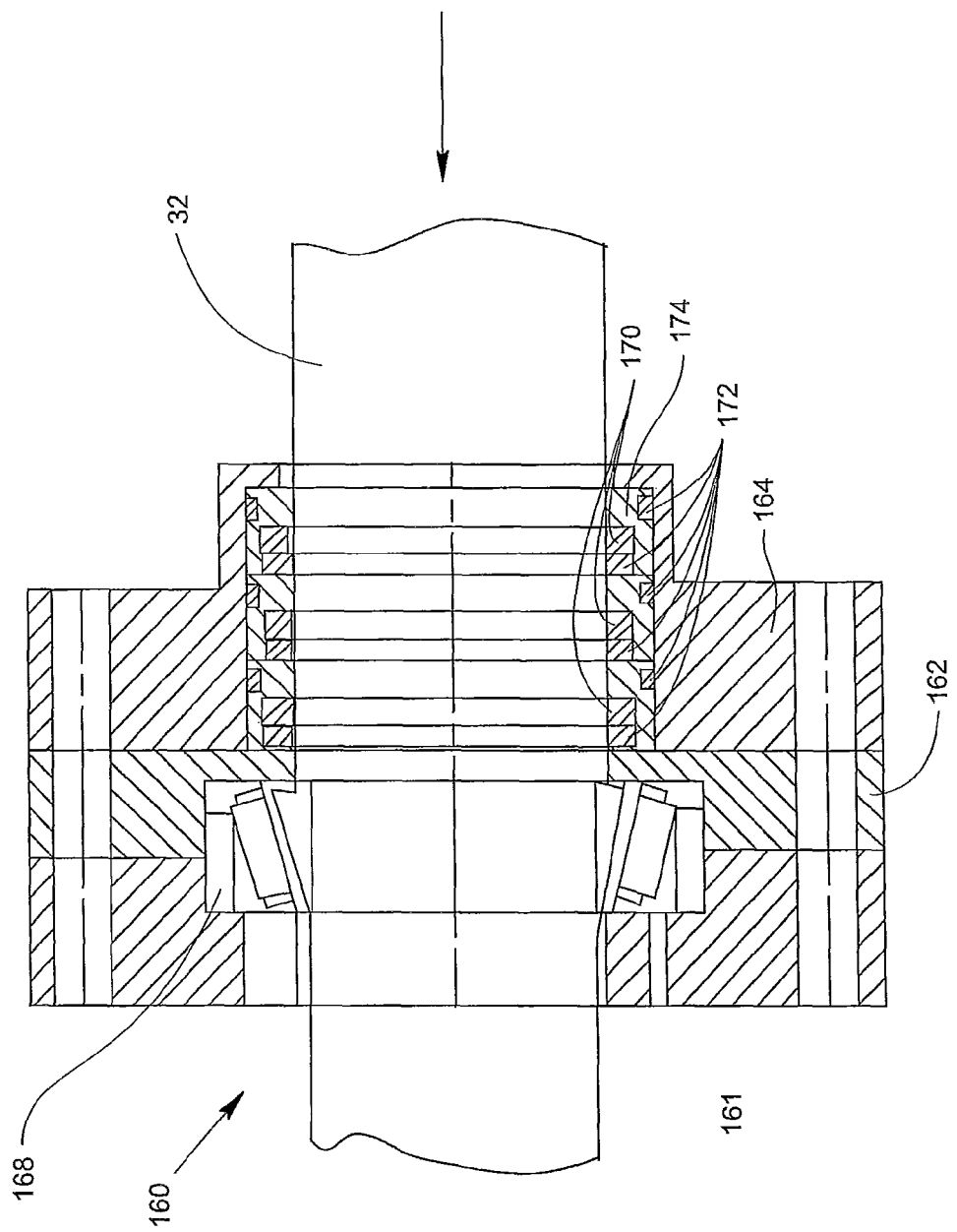
FIG. 12 shows a side elevational view of the radial bearing assembly of the strainer assembly.
Figure 13:
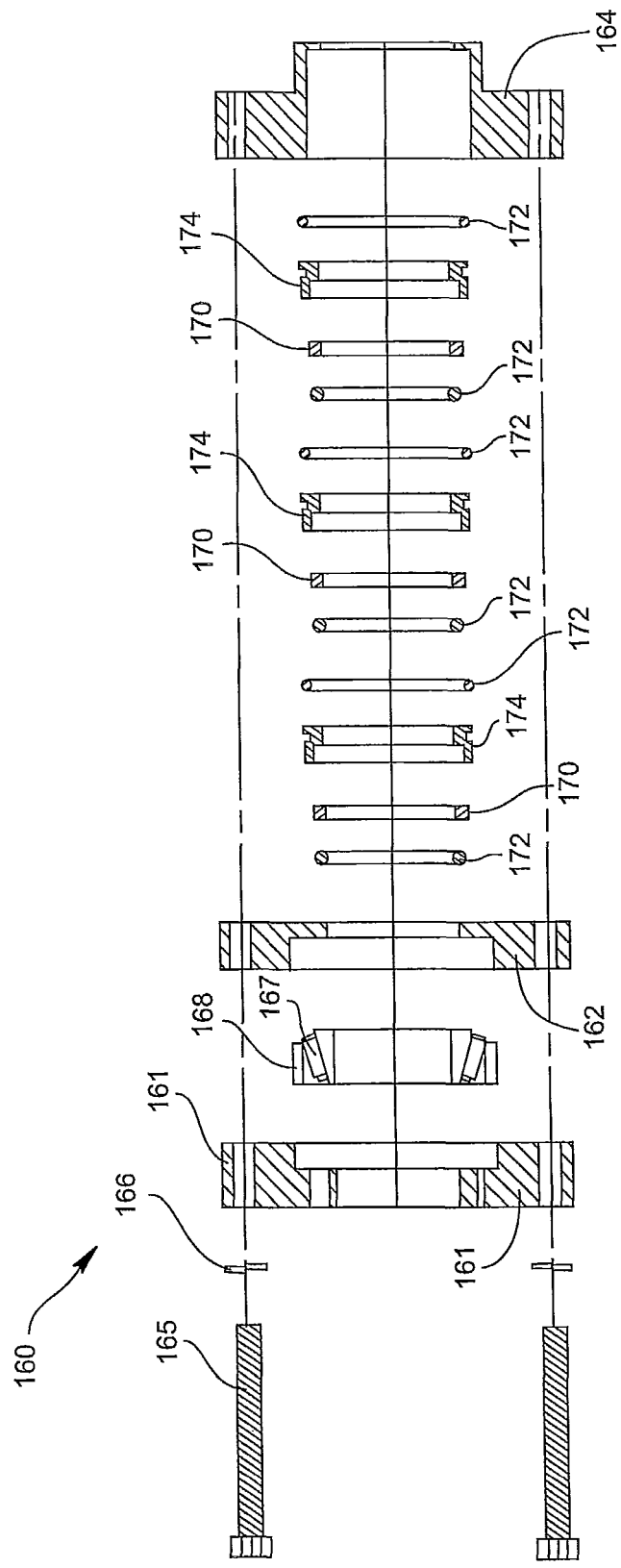
FIG. 13 shows an expanded view of the radial bearing assembly of FIG. 12.
Figure 13B:
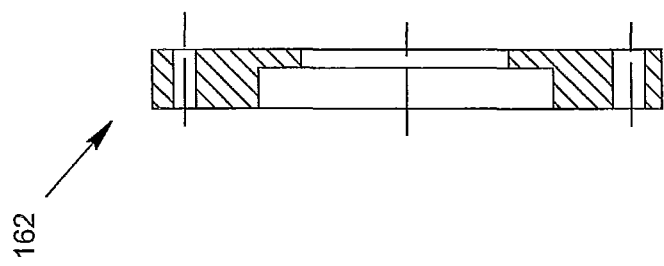
FIGS. 13A and 13B show a front and side elevational view, respectively, of the outer ring housing of the bearing assembly of FIGS. 12 and 13.
Figure 13A:
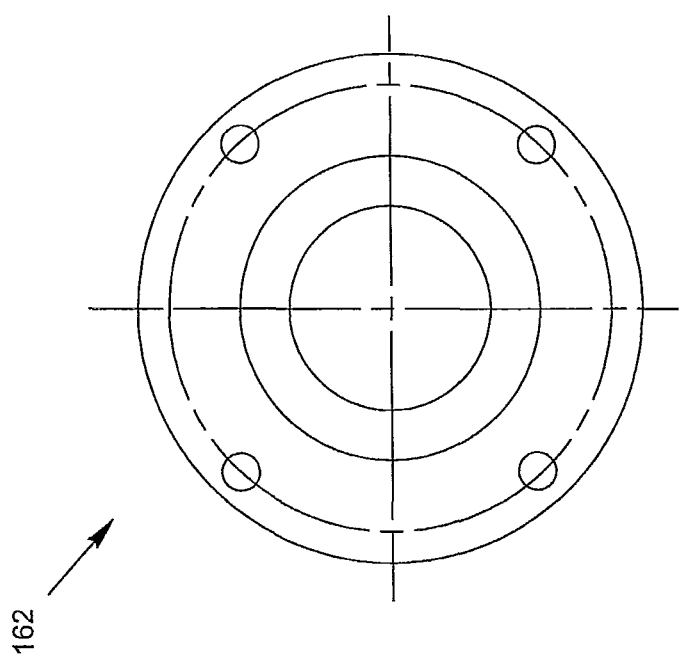
Figures 13C, 13D:
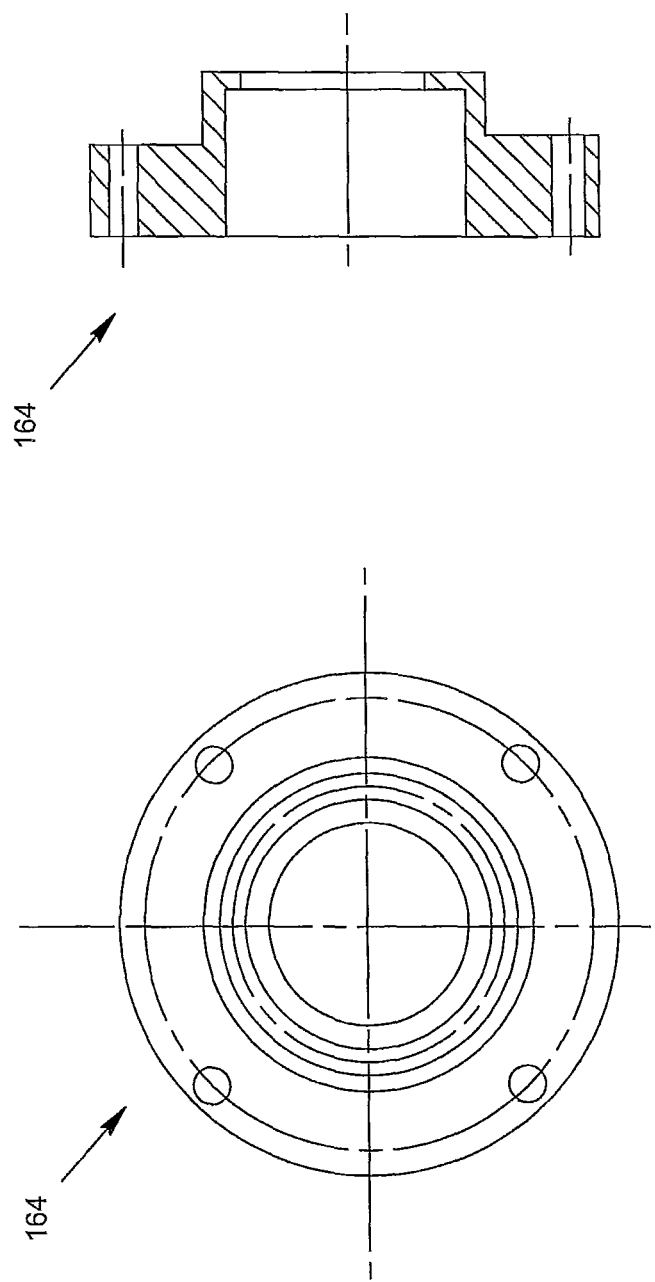
FIGS. 13C and 13D show a front and side elevational view, respectively, of the radial seal housing of the bearing assembly of FIGS. 12 and 13.

Another efficiency improving design of the invention is the provision of a radial seal bearing assembly, generally indicated as 160, as shown in FIGS. 12 and 13, associated with the rotatable strainer member 16. This radial seal 160 includes retaining rings that float with the drive shaft 32, to prevent corn mash from working its way up into the drive shaft 32 or support gear and is held by a series of O-rings and backing rings to prevent galling. As shown in detail in FIG. 13, the radial seal 160 includes a bearing retainer 161, and a seal housing 164 secured together via a series of screws 165 and washers 166. The seal housing 164 is shown in FIGS. 13C and 13D. Contained within the seal housings 162, 164 is the radial bearing 167, enclosed by an outer bearing ring 168. As stated above, the radial bearing 167 is packed with a series of square-shaped backing rings 170, O-rings 172 and O-ring retainers 174. The number and design of the square-shaped backing rings, O-rings, and O-ring retainers can be varied, as needed, depending upon the size of the strainer member 16. The outer seal housing 162 is shown in FIGS. 13A, 13B.

Figure 14:
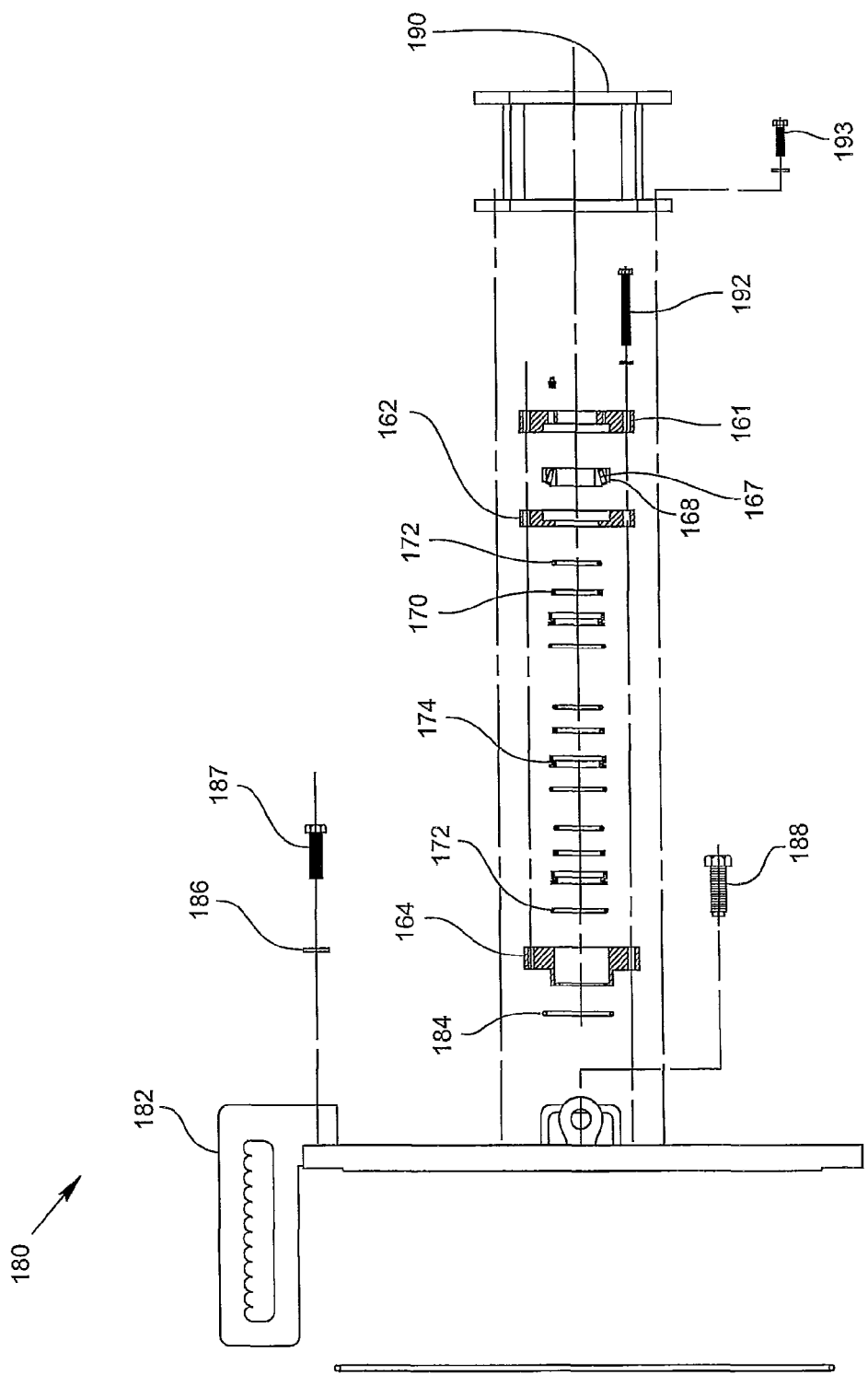
FIG. 14 shows an expanded side view of the cover subassembly for use with the radial bearing assembly of FIG. 12.

FIG. 14 shows an expanded view of the cover sub-assembly, generally indicated as 180, which can be used in combination with radial bearing assembly 160, for use with the strainer body 14 of the invention. The cover sub-assembly 180 includes a closure cover fabrication 182, at least two O-rings 184, a plurality of washers and screws 186, 187, at least two jacking screws 188, the radial bearing assembly 160, a reducer mount 190, secured around the radial bearing assembly 160 via a plurality of screws and washers 192, 193.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of this description. For example, it is to be understood that the present invention contemplates that, to the extent possible, one or more features of any embodiment can be combined with one or more features of any other embodiment.

The invention claimed is:

1. A strainer assembly for straining a slurry, said strainer assembly comprising:
   (a) an inlet for receiving such slurry;
   (b) a horizontally disposed strainer body in fluid communication with said inlet;
   (c) a rotatable strainer member received within said body having an inner surface and an outer surface, said strainer defining a plurality of passageways for strained fluid to pass therethrough;
   (d) one or more scrapers positioned in close proximity with said outer surface of said strainer member for removing material from said outer surface of the strainer member;
   (e) a collection vessel positioned substantially below said body for receiving material scraped from said outer surface of said strainer member; and
   (f) an outlet for expelling the strained slurry in fluid communication with said horizontal strainer body.

2. The strainer assembly of claim 1 wherein said one or more scrapers comprises at least one pair of scrapers located substantially equidistant from one another about the periphery of the strainer member to apply a substantially equal load to a support member supporting the strainer member.

3. The strainer assembly of claim 2 wherein said one or more scrapers comprises two pairs of scrapers spaced along the length of the strainer member.

4. The strainer assembly of claim 1 wherein said one or more scrapers comprises at least one group of three scrapers located substantially equidistant from one another about the periphery of the strainer member to apply a substantially equal load to a support member supporting the strainer member.

5. The strainer assembly of claim 4 wherein said one or more scrapers comprises three sets of the group of three scrapers spaced along the length of the strainer member.

6. A strainer assembly for straining a slurry, said strainer assembly comprising:
   (a) an inlet for receiving such slurry;
   (b) a horizontally disposed strainer body in fluid communication with said inlet;
   (c) a rotatable strainer member received within said body having an inner surface and an outer surface, said strainer defining a passageway for strained fluid to pass therethrough;
   (d) at least one scraper positioned in close proximity with said outer surface of said strainer member for removing material from said outer surface of the strainer member;
   (e) a collection vessel positioned substantially below said body for receiving material scraped from said outer surface of said strainer member;
   (f) an outlet for expelling the strained slurry in fluid communication with said horizontal strainer body; and
   (g) a washdown system for intermittent removal of slurry material from the strainer member.

7. The strainer assembly of claim 6 wherein said washdown system comprises a set of internal wash nozzles located within said strainer body, said wash nozzles being associated with a plurality of wash connection members secured to and extending through the strainer body.

8. The strainer assembly of claim 6 wherein said washdown system is automatically activated.

9. The strainer assembly of claim 6 wherein said washdown system is manually activated.

10. The strainer assembly of claim 6 wherein said washdown system is activated and washdown occurs while said strainer member rotates.

11. The strainer assembly of claim 6 including a transporting member for transporting the material from the collection vessel to a predetermined location for recycling and subsequent straining thereof.

12. A strainer assembly for straining a slurry, said strainer assembly comprising:
   (a) an inlet for receiving such slurry;
   (b) a horizontally disposed strainer body in fluid communication with said inlet;
   (c) a rotatable strainer member received within said body having an inner surface and an outer surface, said strainer defining a passageway for strained fluid to pass therethrough;
   (d) at least one scraper positioned in close proximity with said outer surface of said strainer member for removing material from said outer surface of the strainer member;
   (e) a collection vessel positioned substantially below said body for receiving material scraped from said outer surface of said strainer member;
   (f) an outlet for expelling the strained slurry in fluid communication with said horizontal strainer body; and
   (g) a radial bearing assembly for mounting said rotatable strainer member.

13. The strainer assembly of claim 12 including at least one radial seal for cooperating with the radial bearing assembly.

14. The strainer assembly of claim 12 wherein the radial bearing includes packing comprising a series of O-rings and backing rings.

15. An apparatus for processing a slurry comprising:
   means for feeding a slurry to an inlet of an automatic strainer assembly to strain the slurry;
   means for scraping the strained material from the automatic strainer assembly;
   means for collecting the strained slurry from an outlet of the automatic strainer assembly;
   means for retrieving the scraped material from the strained slurry and transporting this material back to a predetermined location; and
   means for washing down the automatic strainer assembly for intermittent removal of slurry material from the strainer assembly.

16. The apparatus for processing a slurry as in claim 15, including a means for producing the slurry.

* * * * *